(12) United States Patent
Itoh

(10) Patent No.: US 9,286,580 B2
(45) Date of Patent: Mar. 15, 2016

(54) TERMINAL APPARATUS, DISPLAY METHOD, RECORDING MEDIUM, AND DISPLAY SYSTEM

(71) Applicant: YAHOO JAPAN CORPORATION, Tokyo (JP)

(72) Inventor: Shinsuke Itoh, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 68 days.

(21) Appl. No.: 14/022,745

(22) Filed: Sep. 10, 2013

(65) Prior Publication Data
US 2015/0061993 A1 Mar. 5, 2015

(30) Foreign Application Priority Data
Aug. 29, 2013 (JP) ................................. 2013-178603

(51) Int. Cl.
| G06Q 10/00 | (2012.01) |
| G06Q 10/02 | (2012.01) |
| G06F 3/0484 | (2013.01) |
| G06Q 30/06 | (2012.01) |
| G06F 3/0346 | (2013.01) |

(52) U.S. Cl.
CPC .............. *G06Q 10/02* (2013.01); *G06F 3/0346* (2013.01); *G06F 3/04845* (2013.01); *G06Q 30/06* (2013.01); *G06Q 30/0643* (2013.01)

(58) Field of Classification Search
None
See application file for complete search history.

(56) References Cited

U.S. PATENT DOCUMENTS

| 2002/0082879 A1* | 6/2002 | Miller et al. ....................... 705/5 |
| 2006/0132675 A1 | 6/2006 | Choi |
| 2007/0265892 A1* | 11/2007 | Valentino ................ G06Q 10/02 705/5 |
| 2008/0255889 A1* | 10/2008 | Geisler et al. ..................... 705/5 |
| 2009/0256839 A1* | 10/2009 | Bastian .................. G06Q 10/02 345/419 |
| 2010/0257195 A1* | 10/2010 | Inoue et al. .................... 707/769 |
| 2011/0072367 A1* | 3/2011 | Bauer ................. G06F 3/04815 715/757 |
| 2011/0221745 A1* | 9/2011 | Goldman ............... G06Q 30/02 345/419 |
| 2011/0239136 A1* | 9/2011 | Goldman ............... G06N 3/006 715/757 |
| 2012/0010913 A1* | 1/2012 | Lele et al. ......................... 705/5 |
| 2012/0062595 A1 | 3/2012 | Oh et al. |

(Continued)

FOREIGN PATENT DOCUMENTS

| GB | 2378627 A | 2/2003 |
| JP | H08-287291 A | 11/1996 |

(Continued)

OTHER PUBLICATIONS

Jun. 23, 2015 Office Action issued in Japanese Patent Application No. 2013-178603.

*Primary Examiner* — Dismery Mercedes
(74) *Attorney, Agent, or Firm* — Oliff PLC

(57) ABSTRACT

A terminal apparatus provides a highly convenient user interface. The terminal apparatus includes a designated direction detection unit and a display control unit. The designated direction detection unit detects a designated direction, which is a direction in which the terminal apparatus is directed, with respect to a reference direction as a reference of the direction of the terminal apparatus on the basis of a signal from a sensor that outputs a signal indicating the attitude of the terminal apparatus. The display control unit displays an image, in which the direction in which the object is directed with respect to the reference direction is maintained and the object is disposed at the end of a direction corresponding to the designated direction, on a display device.

14 Claims, 15 Drawing Sheets

(56) References Cited

U.S. PATENT DOCUMENTS

| | | | |
|---|---|---|---|
| 2012/0242656 A1* | 9/2012 | McArdle et al. | 345/419 |
| 2012/0323612 A1* | 12/2012 | Callaghan | G06Q 10/02 705/5 |
| 2013/0159030 A1* | 6/2013 | Tattenbaum | G07B 5/00 705/5 |
| 2013/0268899 A1* | 10/2013 | Valentino | G06Q 10/02 715/852 |
| 2014/0195277 A1* | 7/2014 | Kim | 705/5 |

FOREIGN PATENT DOCUMENTS

| | | |
|---|---|---|
| JP | H11-316769 A | 11/1999 |
| JP | A-2002-109336 | 4/2002 |
| JP | 2002-298160 A | 10/2002 |
| JP | 2007-535007 A | 11/2007 |
| JP | 2012-059263 A | 3/2012 |

* cited by examiner

FIG.4

| VIEWPOINT ID | HEIGHT | SEX | AGE | ... | THREE-DIMENSIONAL MODEL |
|---|---|---|---|---|---|
| V001 | 170 TO 180 cm | MALE | 30 TO 40 | ... | *** |
| V002 | 160 TO 170 cm | FEMALE | 30 TO 40 | ... | *** |
| ⋮ | ⋮ | ⋮ | ⋮ | ... | ⋮ |

| SEAT ID | VIEWING DIRECTION | VIEWING DISTANCE |
|---|---|---|
| S001 | $d_{V1}$ | $L_1$ |
| S002 | $d_{V2}$ | $L_2$ |
| S003 | $d_{V3}$ | $L_3$ |
| ⋮ | ⋮ | ⋮ |

FIG.6
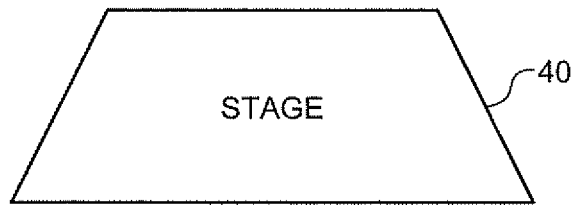
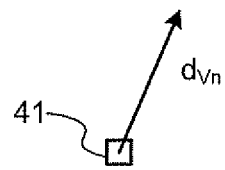
FIG.7
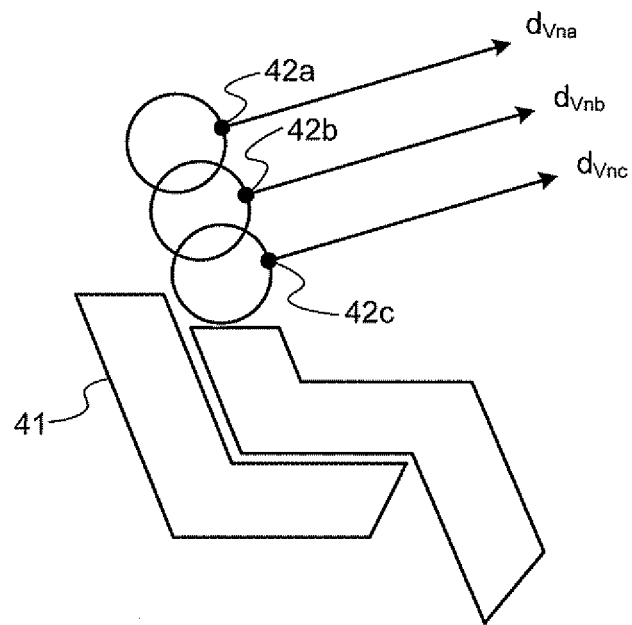

| SEAT ID 250 | RESERVATION INFORMATION 251 | VIEWPOINT ID 252 | PRICE INFORMATION 253 | RESERVATION PERSON INFORMATION 254 |
|---|---|---|---|---|
| S001 | RESERVED | V005 | S | aaa |
| S002 | UNRESERVED | - | A | bbb |
| ⋮ | ⋮ | ⋮ | ⋮ | ⋮ |

| SEAT ID | VIEWING DIRECTION | VIEWING DISTANCE | RESERVATION INFORMATION | VIEWPOINT ID | PRICE INFORMATION |
|---|---|---|---|---|---|
| S001 | $d_{V1}$ | $L_1$ | RESERVED | V005 | S |
| S002 | $d_{V2}$ | $L_2$ | UNRESERVED | - | A |
| ⋮ | ⋮ | ⋮ | ⋮ | ⋮ | ⋮ |

| VIEWPOINT ID | THREE-DIMENSIONAL MODEL |
|---|---|
| V001 | *** |
| V002 | *** |
| ⋮ | ⋮ |

PHYSICAL INFORMATION

HEIGHT [ 173 ] cm

◉ MALE ○ FEMALE

AGE [ 36 ]

☑ ARRANGEMENT DESIGNATION

NUMBER OF SEATS: [ 5 ]

☑ ONLY ONE HORIZONTAL ROW

☐ PASSAGE MAY BE INTERPOSED BETWEEN SEATS

[ OK ]

TERMINAL APPARATUS, DISPLAY METHOD, RECORDING MEDIUM, AND DISPLAY SYSTEM

CROSS-REFERENCE TO RELATED APPLICATIONS

The present application claims priority to and incorporates by reference the entire contents of Japanese Patent Application No. 2013-178603 filed in Japan on Aug. 29, 2013.

BACKGROUND OF THE INVENTION

1. Field of the Invention

The present invention relates to a terminal apparatus, a display method, a recording medium, and a display system.

2. Description of the Related Art

A seat reservation system that displays how a stage will look like from the designated seat by computer graphics when a user reserves a seat in a concert hall or the like is disclosed in Japanese Laid-open Patent Publication No. 2002-109336. Using this seat reservation system, the user can reserve a seat while checking the actual view of the stage.

When reserving a seat using the technique disclosed in the above-described Literature, the user first designates a seat and checks a view from the designated seat. Then, if the user does not like the displayed view, the user designates another seat and checks a displayed view from there.

Incidentally, a size, the number of seats, the arrangement of seats, and the like differ depending on each concert hall in many cases. For this reason, in many cases, until the view from a seat is displayed, it is difficult for the user to predict how the stage will look like. Therefore, in order to find a seat close to the desired view, the user has to repeatedly designate a seat and to check the displayed view from the seat many times. Such an operation is a tedious work for the user.

SUMMARY OF THE INVENTION

It is an object of the present invention to at least partially solve the problems in the conventional technology.

According to one aspect of an embodiment, a terminal apparatus includes a designated direction detection unit and a display control unit. The designated direction detection unit detects a designated direction, which is a direction in which the terminal apparatus is directed, with respect to a reference direction as a reference of the direction of the terminal apparatus on the basis of a signal from a sensor that outputs a signal indicating the attitude of the terminal apparatus. The display control unit displays an image, in which the direction in which the object is directed with respect to the reference direction is maintained and the object is disposed at the end of a direction corresponding to the designated direction, on a display device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of the structure of the data held in a viewpoint information holding unit;

FIG. 5 is a diagram illustrating an example of the structure of the data held in a seating information holding unit;

FIG. 6 is a conceptual diagram for explaining an example of a viewing direction $d_{Vn}$;

FIG. 7 is a conceptual diagram for explaining examples of viewing directions $d_{Vna}$ to $d_{Vnc}$ according to the physical characteristics;

FIG. 10 is a diagram illustrating an example of the data structure of the seating information;

FIG. 11 is a diagram illustrating an example of the data structure of a reservation person model;

FIG. 12 is a conceptual diagram illustrating an example of an input screen;

DETAILED DESCRIPTION OF THE PREFERRED EMBODIMENTS

First Embodiment

First, a first embodiment will be described with reference to the drawings.

Outline of a Process in the First Embodiment

Figure 1:
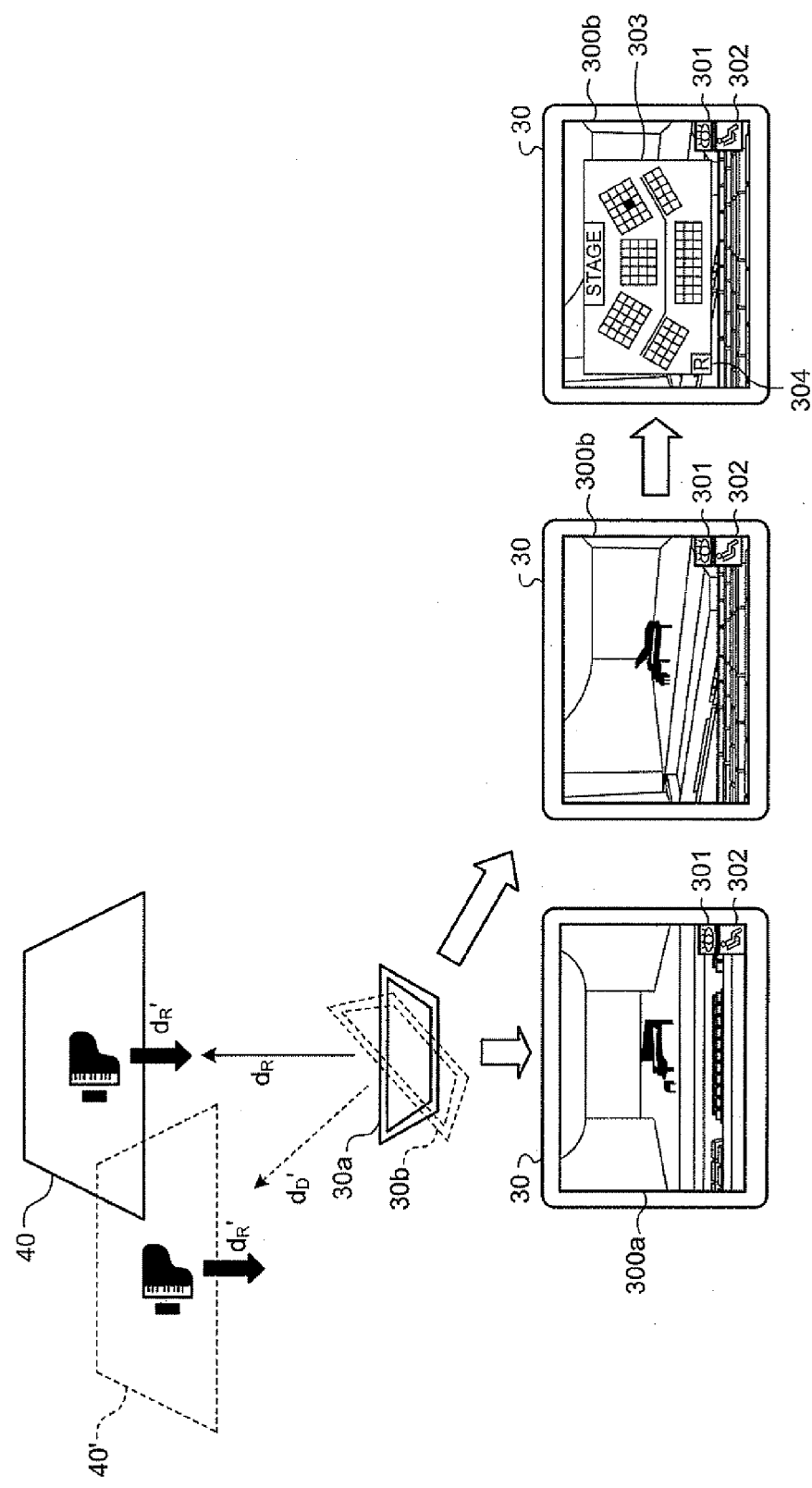
FIG. 1 is a conceptual diagram for explaining an example of the outline of the process in a first embodiment.

FIG. 1 is a conceptual diagram for explaining an example of the outline of the process in the first embodiment. First, for a predetermined object 40 such as a stage of a concert hall, a terminal apparatus 30 in the present embodiment displays an image 300a of the object 40 when viewed from a reference direction $d_R$ (for example, a direction when a stage is viewed from a seat in the middle), which is set in advance, on the screen of the terminal apparatus 30. In addition, the object 40 faces a predetermined direction with respect to the reference direction $d_R$. In the example shown in FIG. 1, the object 40 faces a direction $d_R'$ opposite the reference direction $d_R$.

On the screen of the terminal apparatus 30, for example, a view button 301 and a seat button 302 are displayed together with the image 300a. The view button 301 is a button for receiving an instruction to change the view of the object 40. The seat button 302 is a button for receiving an instruction to display the information of a seat in which the view of the object 40 after the change can be realized.

When a user touches the view button 301, the terminal apparatus 30 recognizes the direction of the terminal apparatus 30 at that time as the reference direction $d_R$. In addition, while the user is touching the view button 301, a change in the attitude of the terminal apparatus 30 is measured. On the basis of the measured attitude change, a direction in which the terminal apparatus 30 is directed is detected as a designated direction $d_D$, which is a direction relative to the reference direction $d_R$, when necessary.

For example, as shown in FIG. 1, when the attitude of the terminal apparatus 30 is changed and the direction of the terminal apparatus 30 is changed from a terminal apparatus 30a to a terminal apparatus 30b, the terminal apparatus 30 detects a direction in which the terminal apparatus 30 is directed with respect to the reference direction $d_R$ as the designated direction $d_D$.

In addition, the terminal apparatus 30 creates an image 300b, in which a direction in which the object 40 is directed with respect to the reference direction $d_R$ is maintained and the object 40 is disposed at the end of a direction $d_D'$ corresponding to the designated direction $d_D$, and displays the created image 300b on the screen. The image 300b illustrated in FIG. 1 is an image viewed as if the object 40 facing the direction $d_R'$ was disposed at a position of an object 40' at the end of the direction $d_D'$.

Thus, when the terminal apparatus 30 is directed to the left, the terminal apparatus 30 creates and displays an image viewed as if the object 40 was photographed from the right side. In addition, when the terminal apparatus 30 is directed to the right, the terminal apparatus 30 creates and displays an image viewed as if the object 40 was photographed from the left side. In addition, when the terminal apparatus 30 is directed upward, the terminal apparatus 30 creates and displays an image viewed as if the object 40 was photographed from the lower side. In addition, when the terminal apparatus 30 is directed downward, the terminal apparatus 30 creates and displays an image viewed as if the object 40 was photographed from the upper side.

Thus, when the direction of the terminal apparatus 30 is changed, the terminal apparatus 30 creates and displays an image in which the direction of the object 40 is maintained as a predetermined direction with respect to the reference direction $d_R$ and the object 40 is disposed at the end of the direction in which the terminal apparatus 30 is directed, thereby creating and displaying an image viewed as if the object 40 was photographed turning around the object 40 from the position of the viewpoint according to the direction of the terminal apparatus 30.

Therefore, the user can freely change the view of the object 40, as if the angle of the camera with respect to the object 40 as a photographic subject was changed, with an intuitive operation of changing the direction of the terminal apparatus 30.

In addition, when creating an image in which the object 40 is disposed at the end of the direction in which the terminal apparatus 30 is directed, it is preferable that the terminal apparatus 30 move the object 40 such that a specific point within the object 40 is displayed in a fixed range within the screen of the terminal apparatus 30. Accordingly, the terminal apparatus 30 can realize the switching of the more visible screen.

In addition, when the user touches the seat button 302 displayed on the screen together with the image 300b, the terminal apparatus 30 displays, for example, an image 303 on the screen. The image 303 is an image showing the information of a seat in which the object 40 is viewed in the direction $d_D'$ used in the creation of the image 300b. By viewing the image 303, the user can recognize the position of a seat, in which a view such as the image 300b can be realized, in the concert hall.

In addition, a reservation button 304 to accept the reservation of a seat, in which a view such as the image 300b can be realized, is included in the image 303. The user can reserve a seat, in which a view such as the image 300b can be realized, with a simple operation of touching the reservation button 304.

In addition, although the stage of the concert hall has been described as an example of the object 40 in the present embodiment, the object 40 is not limited thereto and may be a movie screen, a stadium, and the like.

Overall Configuration of a Display System 10 in the First Embodiment

Figure 2:
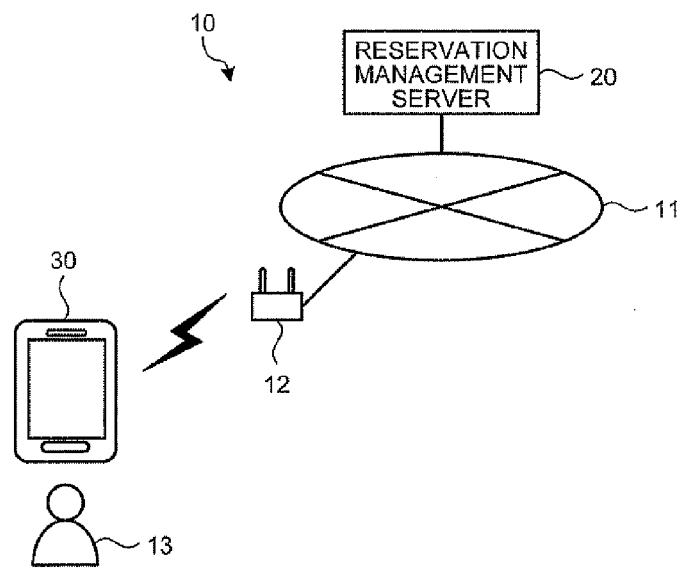
FIG. 2 is a system configuration diagram illustrating an example of a display system in the first embodiment.

FIG. 2 is a system configuration diagram illustrating an example of the display system 10 in the first embodiment. The display system 10 in the present embodiment includes a reservation management server 20 and the terminal apparatus 30.

The reservation management server 20 is connected to a communication line 11, and transmission and reception of communication data are possible through the communication line 11. In addition, the reservation management server 20 holds information, such as the arrangement of seats of the concert hall, a three-dimensional shape of the inside of the concert hall, and seat reservation information, and provides these pieces of information to the terminal apparatus 30 through the communication line 11.

The terminal apparatus 30 performs radio communication with a base station 12 connected to the communication line 11, and transmits and receives communication data to and from the reservation management server 20 through the base station 12 and the communication line 11. In addition, the terminal apparatus 30 acquires the information of the concert hall, which is provided from the reservation management server 20 through the communication line 11, in response to the operation of a user 13. Then, the terminal apparatus 30 creates an image after changing the view of the stage according to the direction of the terminal apparatus 30, and displays the image on the screen.

In addition, the terminal apparatus 30 displays the information of a seat, in which the displayed view can be realized, on the screen in response to the operation of the user 13. In addition, when a seat reservation is received from the user 13, the terminal apparatus 30 transmits the information of the seat reservation to the reservation management server 20 through the communication line 11.

Configuration of the Reservation Management Server 20

Figure 3:
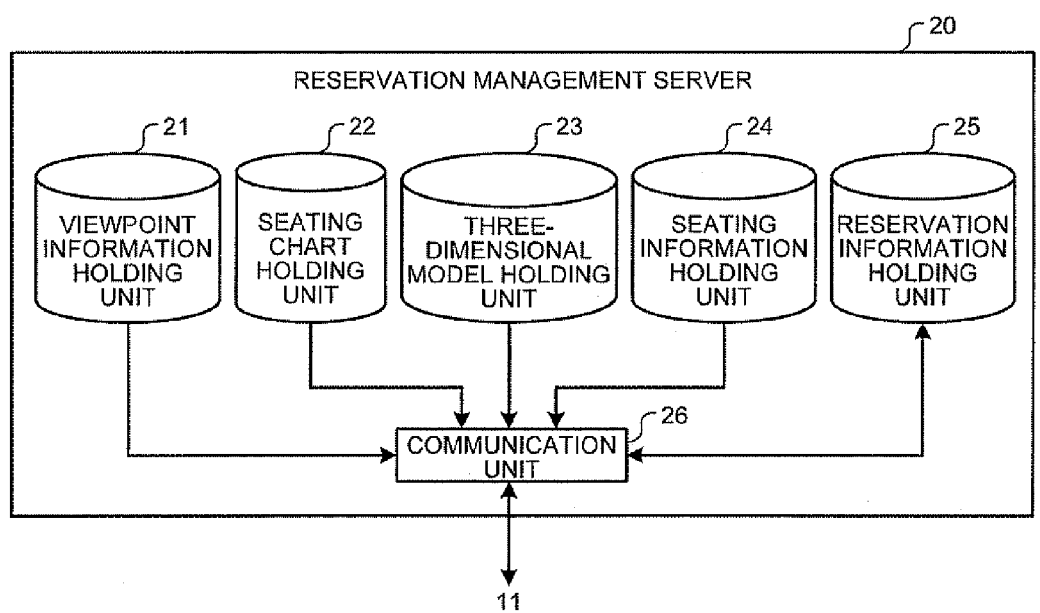
FIG. 3 is a block diagram illustrating an example of the functional configuration of a reservation management server.

FIG. 3 is a block diagram illustrating an example of the functional configuration of the reservation management server 20. The reservation management server 20 includes a viewpoint information holding unit 21, a seating chart holding unit 22, a three-dimensional model holding unit 23, a seating information holding unit 24, a reservation information holding unit 25, and a communication unit 26.

FIG. 4 shows an example of the structure of the data held in the viewpoint information holding unit 21. For example, as shown in FIG. 4, the viewpoint information holding unit 21 holds physical information 211 of a person sitting on the seat and a three-dimensional model 212, which shows the physical information 211, in advance so as to associate a viewpoint ID 210 to identify the height of the viewpoint when a person sits on the seat.

For example, the range of height, sex, the range of age, and the like are included in the physical information 211. Moreover, in addition to these, physical characteristics (for example, information specifying the race) related to the size of the human body may be included in the physical information 211. The three-dimensional model 212 is, for example, a wire model of a person having a standard body shape, which is derived from the corresponding physical information 211. In addition, for example, in the three-dimensional model 212 corresponding to the female, a wire model of a three-dimensional model having a larger hair volume than the male may be assigned.

In FIG. 4, an example is shown in which the viewpoint information holding unit 21 holds the physical information 211, in which the height is in the range of 170 to 180 cm, sex is a male, and the range of age is 30 to 40, and the three-dimensional model 212 of "***", so as to associate the viewpoint ID 210 of "V001", for example.

The seating chart holding unit 22 holds the seating chart of the concert hall in advance. The three-dimensional model holding unit 23 holds the information, which indicates the three-dimensional shape of the inside of the concert hall including the seats and the stage as an object, in advance. In the present embodiment, for example, the three-dimensional model holding unit 23 holds a wire model within the concert hall as information indicating the three-dimensional shape in advance.

FIG. 5 shows an example of the structure of the data held in the seating information holding unit 24. The seating information holding unit 24 holds a viewing direction table 241 in advance for each viewpoint ID 240. A viewing direction 243 and a viewing distance 244 are stored in advance in each viewing direction table 241 so as to associate a seat ID 242.

In FIG. 5, an example is shown in which the seating information holding unit 24 holds the viewing direction table 241 so as to associate the viewpoint ID 240 of "V001", for example. In addition, in FIG. 5, an example is shown in which the viewing direction 243 of "$d_{V1}$" and the viewing distance 244 of "$L_1$" are stored in the viewing direction table 241 so as to associate the seat ID 242 of "S001".

For example, as shown in FIG. 6, the viewing direction 243 indicates a direction of the line of sight in three-dimensional space when a stage (for example, middle of the stage) as the object 40 is viewed from a seat 41 of the corresponding seat ID. The viewing direction 243 is information of a vector indicating a direction from the viewpoint corresponding to the viewpoint ID, for example. In addition, in the concert hall, each seat is disposed such that the stage is visible from all seats. For this reason, when a person sitting on each seat sees the same area on the stage, the direction of the line of sight (a direction within the horizontal plane and a direction within the vertical plane) differs slightly depending on each seat. For example, in first-floor and second-floor seats, a component within the horizontal plane in the viewing direction is the same but a component within the vertical plane in the viewing direction is different.

In addition, depending on the sitting height or the eye position of a person sitting on the seat, the position of the viewpoint of the person sitting on the seat with respect to the position of the seat is different. For example, as shown in FIG. 7, when the viewpoint of a person sitting on the seat 41 is a position 42a, the man sees the stage at the end in a viewing direction $d_{Vna}$. In addition, when the viewpoint of the person sitting on the seat 41 is a position 42b, the man sees the stage at the end in a viewing direction $d_{Vnb}$. In addition, when the viewpoint of the person sitting on the seat 41 is a position 42c, the man sees the stage at the end in a viewing direction $d_{Vnc}$.

Therefore, in the present embodiment, the seating information holding unit 24 holds a viewing direction, in which a standard person sitting on the seat sees the object 40 from the position of the viewpoint with respect to the position of the seat and which is derived from the physical characteristics, for each seat so as to associate the viewpoint ID (refer to FIG. 4) assigned to each piece of physical information indicating the physical characteristics.

In addition, the viewing distance 244 indicates a distance from the position of the viewpoint of a person sitting on the corresponding seat to a predetermined area within the stage. The viewing distance 244 is related to the size of the stage in a two-dimensional image when the stage is viewed from the position of the viewpoint of the person sitting on the corresponding seat. For example, the longer the viewing distance 244 is, the smaller is the stage displayed in the two-dimensional image, and the shorter the viewing distance 244 is, the larger is the stage displayed in the two-dimensional image.

Figures 8, 9:
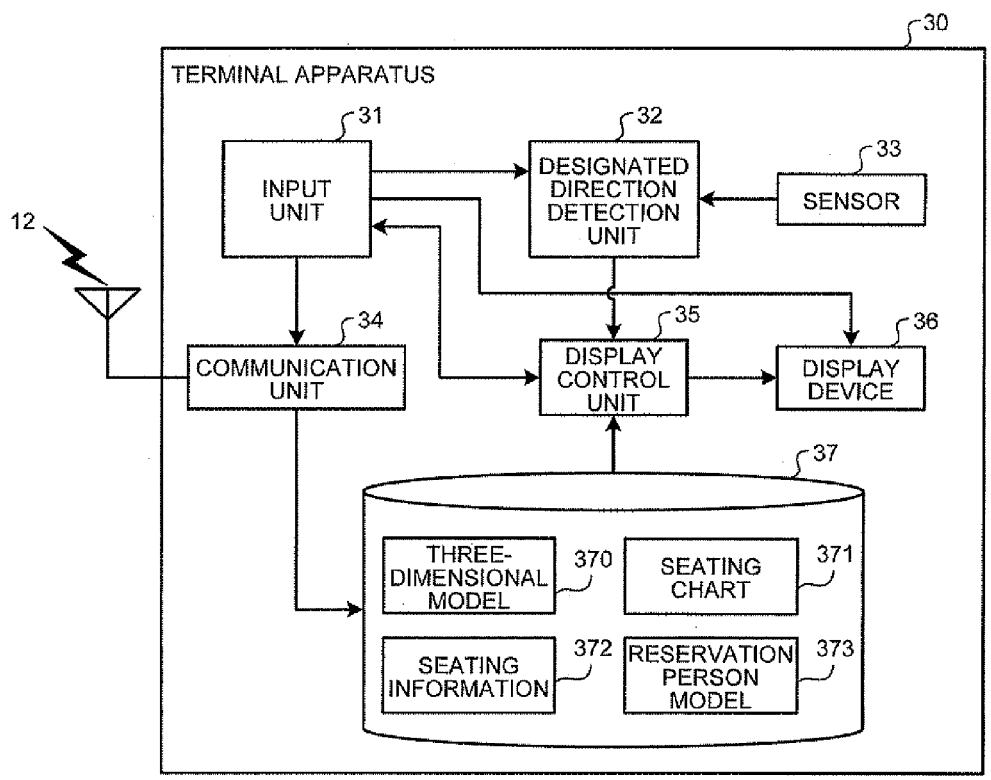
FIG. 8 is a diagram illustrating an example of the structure of the data held in a reservation information holding unit.
FIG. 9 is a block diagram illustrating an example of the functional configuration of a terminal apparatus in the first embodiment.

FIG. 8 shows an example of the structure of the data held in the reservation information holding unit 25. For example, as shown in FIG. 8, the reservation information holding unit 25 holds reservation information 251, a viewpoint ID 252, price information 253, and reservation person information 254 so as to associate a seat ID 250.

The reservation information 251 is information indicating whether or not the corresponding seat is reserved. The viewpoint ID 252 is a viewpoint ID assigned to the physical information of a person, who made a reservation, when the corresponding seat is reserved. The price information 253 is information indicating the price range of the corresponding seat. The reservation person information 254 is information indicating the user ID, name, or contact of a person, who made a reservation, when the corresponding seat is reserved.

In FIG. 8, an example is shown in which the reservation information holding unit 25 holds the reservation information 251 of "reserved", the viewpoint ID 252 of "V005", the price information 253 of "S", and the reservation person information 254 of "aaa" so as to associate the seat ID 250 of "S001", for example.

Referring back to FIG. 3, explanation is continued. When the physical information is received from the terminal apparatus 30 through the communication line 11, the communication unit 26 extracts the viewpoint ID associated with the received physical information from the viewpoint information holding unit 21.

Then, the communication unit 26 extracts the viewing direction table 241 associated with the extracted viewpoint ID from the seating information holding unit 24. Then, the communication unit 26 transmits the viewpoint ID and the viewing direction table 241, which have been extracted, to the terminal apparatus 30 through the communication line 11. In addition, the communication unit 26 transmits the information in the seating chart holding unit 22, the information in the three-dimensional model holding unit 23, and the information in the reservation information holding unit 25 to the terminal apparatus 30 through the communication line 11. In addition, the communication unit 26 extracts the information of a three-dimensional model of a person of each viewpoint ID from the viewpoint information holding unit 21, and transmits the information to the terminal apparatus 30 through the communication line 11.

In addition, when a reservation request including a viewpoint ID and a seat ID is received from the terminal apparatus 30 through the communication line 11, the communication unit 26 holds the viewpoint ID and the reservation person information, which are included in the reservation request, in the reservation information holding unit 25 so as to associate the seat ID included in the received reservation request. Then, the communication unit 26 changes the reservation information, which is associated with the seat ID included in the received reservation request, to information indicating "reserved".

Configuration of the Terminal Apparatus 30 in the First Embodiment

FIG. 9 is a block diagram illustrating an example of the functional configuration of the terminal apparatus 30 in the first embodiment. The terminal apparatus 30 in the present embodiment includes an input unit 31, a designated direction detection unit 32, a sensor 33, a communication unit 34, a display control unit 35, a display device 36, and a storage unit 37. The terminal apparatus 30 in the present embodiment is, for example, a smart phone, a tablet PC (Personal Computer), or other information processing apparatus.

The storage unit 37 holds a three-dimensional model 370, a seating chart 371, seating information 372, and a reservation person model 373. The three-dimensional model 370 is information indicating the three-dimensional shape of the inside of the concert hall including the seats and the stage as an object. In the present embodiment, for example, the storage unit 37 holds a wire model within the concert hall as the three-dimensional model 370 indicating the three-dimensional shape. The seating chart 371 is a seating chart of the concert hall.

FIG. 10 shows an example of the data structure of the seating information 372. For example, as shown in FIG. 10, a viewing direction 3721, a viewing distance 3722, reservation information 3723, a viewpoint ID 3724, and price information 3725 are stored in the seating information 372 so as to associate a seat ID 3720.

The viewing direction 3721 indicates a viewing direction when the stage as an object is viewed from a seat corresponding to the seat ID 3720. The viewing distance 3722 indicates a distance from the position of the viewpoint, which corresponds to the seat corresponding to the seat ID 3720, to a predetermined area of the stage as an object. The reservation information 3723 indicates whether or not the seat corresponding to the seat ID 3720 is reserved. The viewpoint ID 3724 is a viewpoint ID assigned to the physical information of a person, who made a reservation, when the seat corresponding to the seat ID 3720 is reserved. The price information 3725 is information indicating the price range of the seat corresponding to the seat ID 3720.

In FIG. 10, an example is shown in which the viewing direction 3721 of "$d_{r_1}$", the viewing distance 3722 of "$L_1$", the reservation information 3723 of "reserved", the viewpoint ID 3724 of "V005", and the price information 3725 of "S" are stored in the seating information 372 so as to associate the seat ID 3720 of "S001", for example.

FIG. 11 shows an example of the data structure of the reservation person model 373. For example, as shown in FIG. 11, in the reservation person model 373, a three-dimensional model 3731 is stored so as to associate a viewpoint ID 3730. The viewpoint ID 3730 is information for identifying the height of a standard viewpoint, which is derived according to the physical information. The three-dimensional model 3731 is a wire model showing the three-dimensional shape of a person having a standard body shape, which is derived from the physical information corresponding to the viewpoint ID 3730. In FIG. 11, an example is shown in which the three-dimensional model 3731 of "***" is stored in the reservation person model 373 so as to associate the viewpoint ID 3730 of "V001", for example.

Referring back to FIG. 9, explanation is continued. The communication unit 34 transmits the data, which has been received from the input unit 31, to the reservation management server 20 through the base station 12. In addition, the communication unit 34 stores the information, which has been received from the reservation management server 20 through the base station 12, in the storage unit 37.

Specifically, when the information of the three-dimensional shape (for example, a wire model within the concert hall) is received from the reservation management server 20, the communication unit 34 stores the received information in the storage unit 37 as the three-dimensional model 370. In addition, when the information of the seating chart is received from the reservation management server 20, the communication unit 34 stores the received information of the seating chart in the storage unit 37 as the seating chart 371.

In addition, when the viewpoint ID and the viewing direction table 241 are received from the reservation management server 20, the communication unit 34 stores the data of the viewing direction for each seat ID in the received viewing direction table 241 in the seating information 372 of the storage unit 37. In addition, when the information in the reservation information holding unit 25 is received from the reservation management server 20, the communication unit 34 stores the reservation information, the viewpoint ID, and the price information for each received seat ID in the reservation information holding unit 25 in the seating information 372 of the storage unit 37.

In addition, when the information of a three-dimensional model of a person of each viewpoint ID is received from the reservation management server 20, the communication unit 34 stores the received information in the storage unit 37 as the reservation person model 373.

When an application program for realizing the seat reservation function in the present embodiment is started, the input unit 31 displays, for example, an input screen 50 shown in FIG. 12 on the display device 36, such as a liquid crystal panel. FIG. 12 is a conceptual diagram illustrating an example of the input screen 50.

For example, as shown in FIG. 12, an area 51 for receiving the input of physical information, an area 52 for receiving the information of arrangement designation, and an OK button 53 are displayed on the input screen 50. For example, height, sex, and age are input to the area 51 as physical information.

Here, the arrangement designation is a reservation method for designating the arrangement of seats when making seat reservations for a plurality of persons. Information designating whether or not to perform arrangement designation, the number of seats when performing arrangement designation, conditions required for the arrangement of seats, and the like are input to the area 52. As the conditions required for the arrangement of seats, it is possible to designate whether or not to designate only one horizontal row, whether or not to allow the arrangement having a passage between seats, and the like.

When the OK button 53 is operated, the input unit 31 transmits the physical information input to the area 51 to the communication unit 34. The communication unit 34 transmits the physical information, which has been received from the input unit 31, to the reservation management server 20 through the base station 12. In addition, when the OK button 53 is operated, the input unit 31 instructs the display control unit 35 to display the reference image. In this case, if there is information input to the area 52, the input unit 31 also transmits the information input to the area 52 to the display control unit 35.

In addition, when the user touches the view button 301 (refer to FIG. 1) displayed on the display device 36, the input unit 31 notifies the designated direction detection unit 32 that the user has touched the view button 301. In addition, when the user moves the finger away from the view button 301, the input unit 31 notifies the designated direction detection unit 32 that the user has moved the finger away from the view button 301.

In addition, when the user touches the seat button 302 (refer to FIG. 1) displayed on the display device 36, the input unit 31 notifies the display control unit 35 that the user has touched the seat button 302. Then, the display control unit 35 receives the notification of the seat ID from the display control unit 35. In addition, when the user touches the reservation button 304 in the image 303 (refer to FIG. 1) displayed on the display device 36, the input unit 31 transmits the seat ID notified from the display control unit 35 to the communication unit 34.

The communication unit 34 creates a reservation request including the seat ID received from the input unit 31, the viewpoint ID received from the reservation management server 20, and the reservation person information such as the name of the user of the terminal apparatus 30, and transmits the created reservation request to the reservation management server 20 through the base station 12.

When the notification that the user has touched the view button 301 is received from the input unit 31, the designated direction detection unit 32 specifies a direction, in which the terminal apparatus 30 is currently directed, as the reference direction $d_R$ on the basis of a signal from the sensor 33, such as an acceleration sensor.

In addition, until the notification that the user has moved the finger away from the view button 301 is received from the input unit 31, the designated direction detection unit 32 detects a direction in which the terminal apparatus 30 is directed, as the designated direction $d_D$ with respect to the reference direction $d_R$, on the basis of a signal from the sensor 33 every predetermined timing. For example, the designated direction detection unit 32 detects a back surface side direction of the screen of the terminal apparatus 30 as the designated direction $d_D$ in which the terminal apparatus 30 is directed. Then, the designated direction detection unit 32 transmits the detected designated direction $d_D$ to the display control unit 35. When the notification that the user's finger has moved away from the view button 301 is received from the input unit 31, the designated direction detection unit 32 ends the detection of the designated direction $d_D$.

When the display of a reference image is instructed from the input unit 31, the display control unit 35 creates a reference image by rendering an image of the stage when the stage is viewed from the reference direction (for example, a viewing direction in the seat in the middle of the concert hall) using the information of the three-dimensional model stored in the three-dimensional model 370 of the storage unit 37. In addition, the display control unit 35 disposes the view button 301 and the seat button 302 in the created reference image and displays the result on the display device 36.

In addition, when the information of arrangement designation is received from the input unit 31, the display control unit 35 specifies seat IDs, which are associated with the reservation information indicating "unreserved", with reference to the seating information 372 in the storage unit 37. Then, the display control unit 35 specifies seats satisfying the conditions specified in the arrangement designation received from the input unit 31, among the seats corresponding to the specified seat IDs, with reference to the seating chart 371 in the storage unit 37.

Then, when the designated direction $d_D$ is received from the designated direction detection unit 32, the display control unit 35 searches for a viewing direction closest to the received designated direction $d_D$, among the viewing directions associated with seats which are not reserved and by which the designated arrangement can be realized, with reference to the seating information 372 in the storage unit 37. Then, the display control unit 35 extracts the viewing distance and the price information, which are associated with the searched viewing direction, from the seating information 372.

Then, the display control unit 35 extracts a viewpoint ID, which is associated with the reservation information indicating "reserved", for each seat ID with reference to the seating information 372. Then, the display control unit 35 extracts a three-dimensional model of the reservation person, which is associated with the extracted viewpoint ID, from the reservation person model 373 in the storage unit 37.

Then, the display control unit 35 disposes the three-dimensional model of the reservation person on the reserved seats using the information of the three-dimensional shape of the inside of the concert hall stored in the three-dimensional model 370, and renders a two-dimensional image when the stage located at the extracted viewing distance is viewed from the searched viewing direction. Then, the display control unit 35 displays a created two-dimensional image 300 on the display device 36, for example, as shown in FIG. 13.

Figure 13:
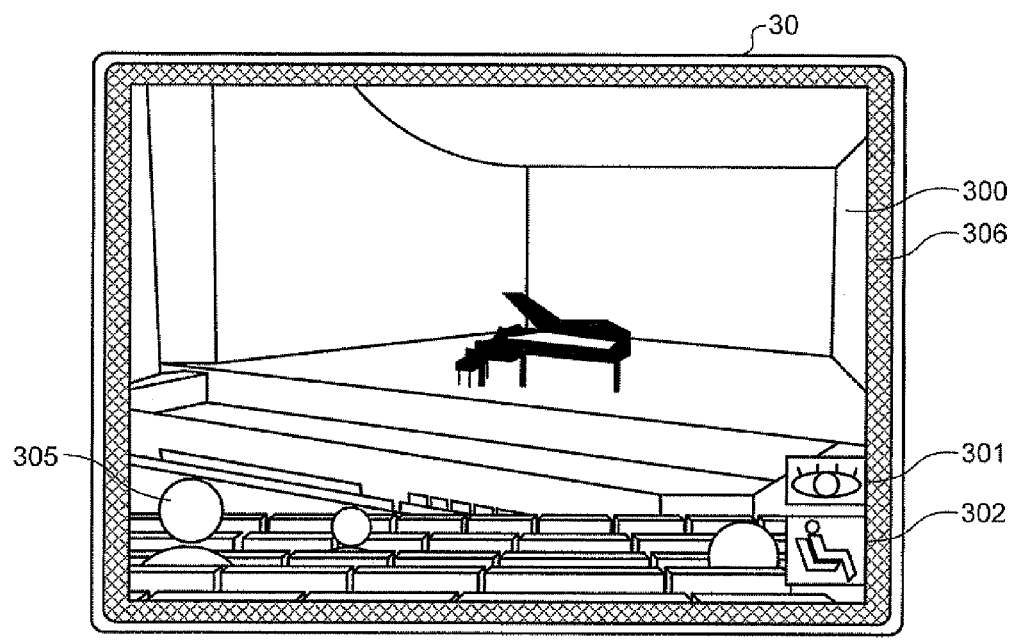
FIG. 13 is a conceptual diagram illustrating an example of an image displayed on a terminal apparatus according to the direction of the terminal apparatus.

FIG. 13 is a conceptual diagram illustrating an example of the two-dimensional image 300 displayed on the terminal apparatus 30 according to the direction of the terminal apparatus 30. In the two-dimensional image 300 shown in FIG. 13, an image 305 based on the three-dimensional model of the reservation person is disposed on the reserved seat. Accordingly, the more practical environment is simulated. In addition, the display control unit 35 may change the method of displaying the image 300 according to the price information associated with the searched viewing direction. In the example shown in FIG. 13, the pattern of an edge 306 of the image 300 is changed according to the price information.

In this manner, the display control unit 35 can display an image, in which the direction of the object with respect to the reference direction $d_R$ is maintained and the object is disposed at the end of a direction close to the direction to which the terminal apparatus 30 is directed, on the display device 36. Therefore, the user can display an image, which is obtained by freely changing the viewing point of the object, on the terminal apparatus 30 with an intuitive operation of changing the direction of the terminal apparatus 30.

In addition, on the reserved seat, a two-dimensional image of the stage is rendered after a three-dimensional model corresponding to the physical information of the reservation person is disposed. Accordingly, the display control unit 35 can simulate how the stage looks like in a situation where people actually sit on other seats.

In addition, when the viewing direction closest to the designated direction $d_D$ received from the designated direction detection unit 32 is the same direction as the viewing direction closest to the designated direction $d_D$ previously received from the designated direction detection unit 32, the display control unit 35 continues displaying the previously created two-dimensional image on the display device 36.

In addition, when the notification that the user has touched the seat button 302 is received from the input unit 31, the display control unit 35 extracts a seat ID, which is associated with the viewing direction used in the creation of the two-dimensional image displayed on the display device 36 at that time, from the seating information 372 in the storage unit 37. Then, the display control unit 35 notifies the input unit 31 of the extracted seat ID.

In addition, the display control unit 35 creates the image 303 of the seating chart, in which the seat corresponding to the extracted seat ID is highlighted, with reference to the seating chart 371 in the storage unit 37, and displays the created image 303 on the display device 36 together with the reservation button 304, for example, as shown in FIG. 1.

When the user touches the reservation button 304, the input unit 31 transmits the seat ID received from the display control unit 35 to the communication unit 34. The communication unit 34 creates a reservation request including the seat ID received from the input unit 31, the viewpoint ID received from the reservation management server 20, and the reservation person information of the user of the terminal apparatus 30. Then, the communication unit 34 transmits the created reservation request to the reservation management server 20 through the base station 12. Thus, seats highlighted in the image 303 of the seating chart are reserved.

Processing of the Terminal Apparatus 30 in the First Embodiment

Figure 14:
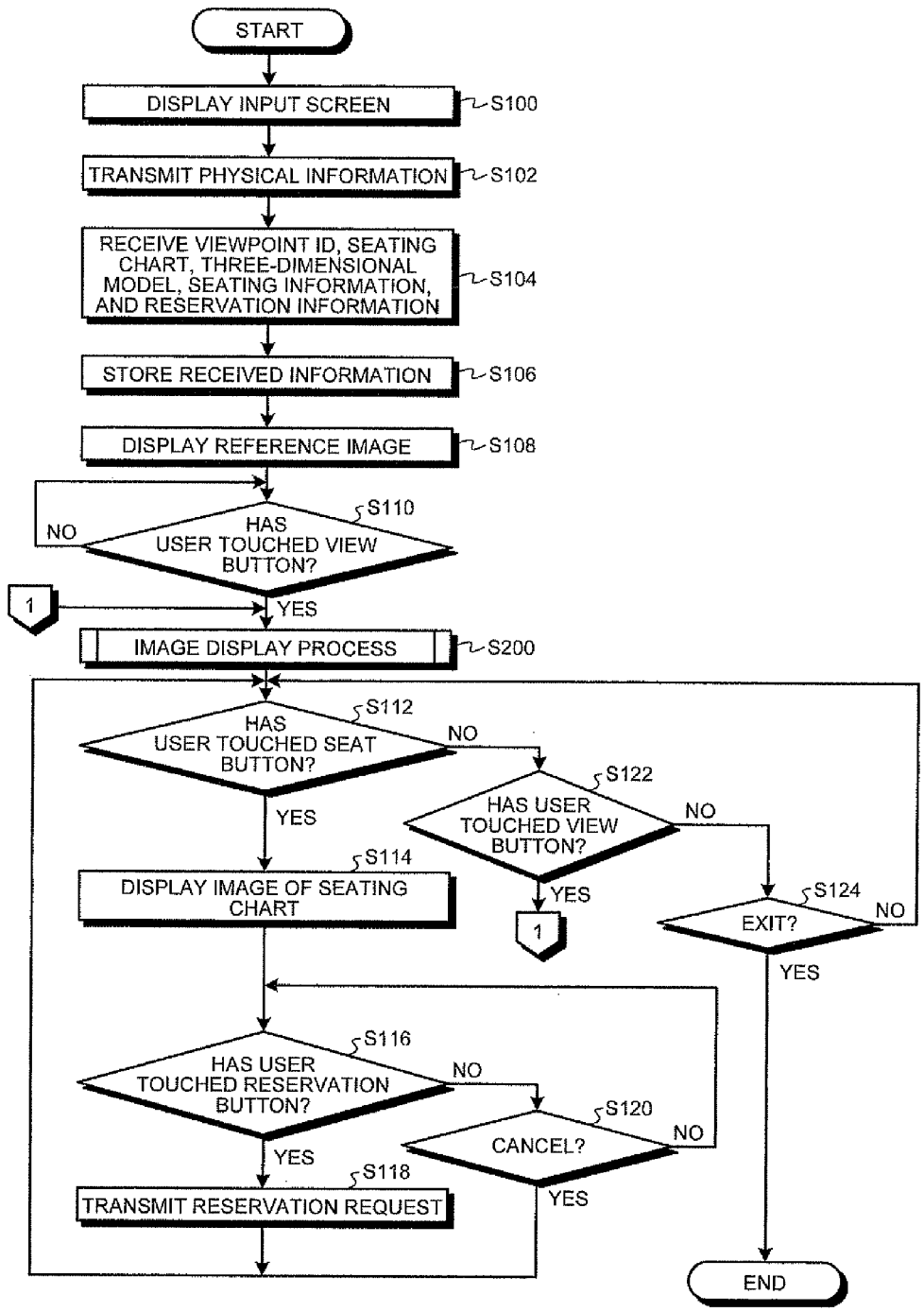
FIG. 14 is a flowchart showing an example of the operation of the terminal apparatus in the first embodiment.

FIG. 14 is a flowchart showing an example of the operation of the terminal apparatus 30 in the first embodiment. For example, when an application program for realizing the seat reservation function in the present embodiment is started, the terminal apparatus 30 starts the operation shown in this flowchart.

First, the input unit 31 displays, for example, the input screen 50 illustrated in FIG. 12 on the display device 36 (S100). Then, when the OK button 53 within the input screen 50 is operated, the input unit 31 transmits the physical information input to the area 51 to the communication unit 34. The communication unit 34 transmits the physical information, which has been received from the input unit 31, to the reservation management server 20 through the base station 12 (S102). Then, the input unit 31 instructs the display control unit 35 to display a reference image. In this case, if there is information input to the area 52, the input unit 31 also transmits the input information to the display control unit 35.

Then, the communication unit 34 receives a viewpoint ID, a seating chart, a three-dimensional model, seating information, and reservation information from the reservation management server 20 through the base station 12 (S104), and stores these received pieces of information in the storage unit 37 (S106). Then, the display control unit 35 creates a reference image by rendering an image of the stage when the stage is viewed from the reference direction (for example, a viewing direction of the seat in the middle of the concert hall) using the information of the three-dimensional model 370 in the storage unit 37. Then, the display control unit 35 displays the created reference image on the display device 36 together with the view button 301 and the seat button 302 (S108).

Then, the input unit 31 determines whether or not the user has touched the view button 301 displayed on the display device 36 (S110). When the user has touched the view button 301 (S110: Yes), the input unit 31 notifies the designated direction detection unit 32 that the user has touched the view button 301. Then, the terminal apparatus 30 displays an image on the display device 36 by executing an image display process to be described later (S200).

Then, the input unit 31 determines whether or not the user has touched the seat button 302 displayed on the display device 36 (S112). When the user has touched the seat button 302 (S112: Yes), the input unit 31 notifies the display control unit 35 that the user has touched the seat button 302. The display control unit 35 extracts a seat ID, which is associated with the viewing direction used in the creation of the two-dimensional image displayed on the display device 36 at that time, from the seating information 372 in the storage unit 37. Then, the display control unit 35 notifies the input unit 31 of the extracted seat ID.

Then, the display control unit 35 creates the image 303 of the seating chart, in which the seat corresponding to the extracted seat ID is highlighted, with reference to the seating chart 371 in the storage unit 37, and displays the created image 303 on the display device 36 together with the reservation button 304, for example, as shown in FIG. 1 (S114).

Then, the input unit 31 determines whether or not the user has touched the reservation button 304 displayed on the display device 36 (S116). When the user touches the reservation button 304 (S116: Yes), the input unit 31 transmits the seat ID notified from the display control unit 35 to the communication unit 34. The communication unit 34 creates a reservation request including the seat ID received from the input unit 31, the viewpoint ID received from the reservation management server 20 in step 3104, and the reservation person information of the user of the terminal apparatus 30. Then, the communication unit 34 transmits the created reservation request to the reservation management server 20 through the base station 12 (S118), and the input unit 31 executes the processing shown in step S112 again.

When the user has not touched the reservation button 304 (S116: No), the input unit 31 determines whether or not an operation to cancel the display of the image 303 of the seating chart has been received (S120). When the operation to cancel the display of the image 303 of the seating chart has not been received (S120: No), the input unit 31 executes the processing shown in step S116 again. When the operation to cancel the display of the image 303 of the seating chart has been received (S120: Yes), the input unit 31 instructs the display device 36 to delete the display of the image 303 and executes the processing shown in step S112 again.

When the user has not touched the seat button 302 (S112: No), the input unit 31 determines whether or not the user has touched the view button 301 displayed on the display device 36 (S122). When the user has touched the view button 301 (S122: Yes), the terminal apparatus 30 executes the image display process shown in step S200 again.

When the user has not touched the view button 301 (S122: No), the input unit 31 determines whether or not the exit of the application program of the seat reservation function has been instructed by the user (S124). When the exit of the application program of the seat reservation function has not been instructed by the user (S124: No), the input unit 31 executes the processing shown in step S112 again. On the other hand, when the exit of the application program of the seat reservation function has been instructed by the user (S124: Yes), the terminal apparatus 30 ends the operation shown in this flowchart.

Figure 15:
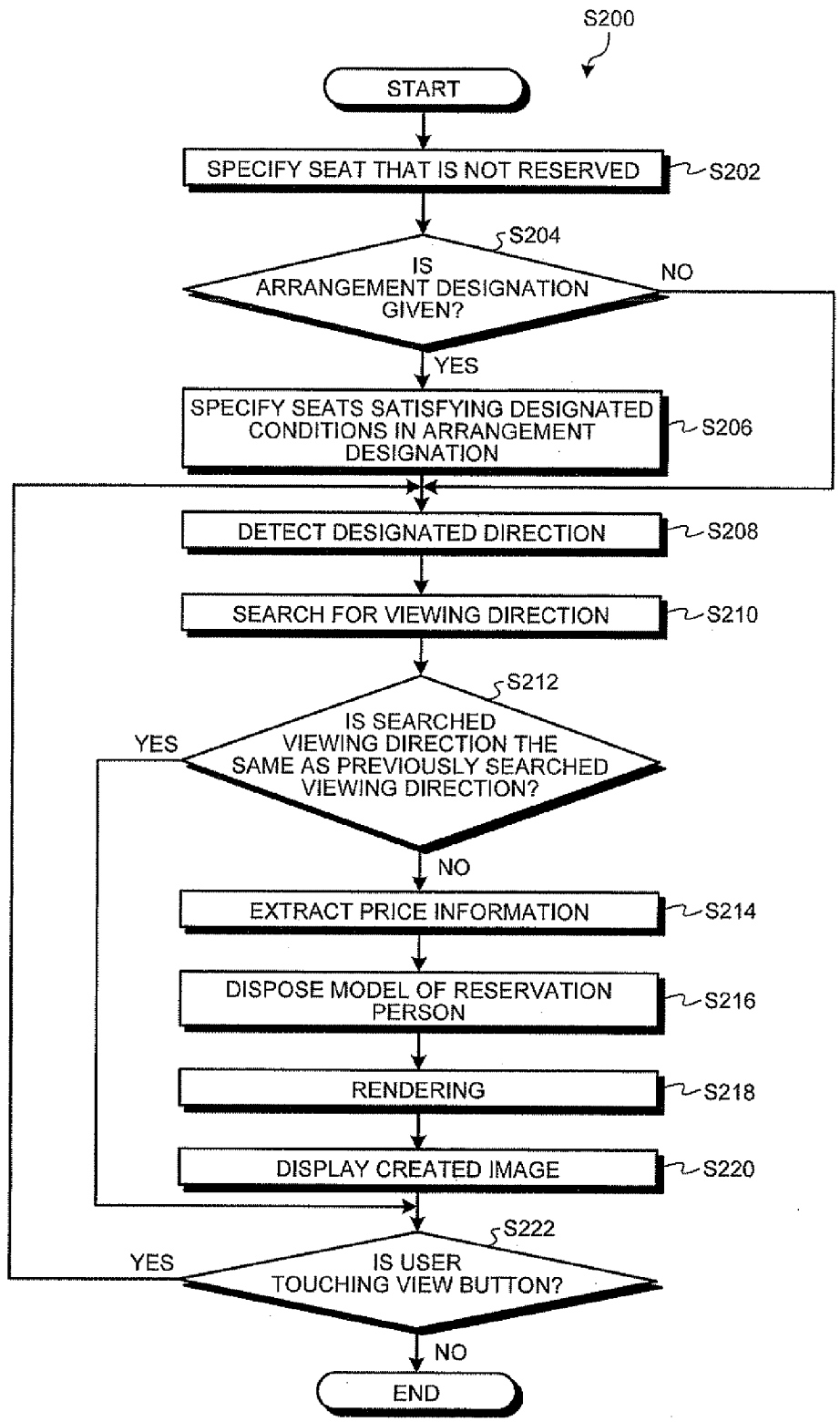
FIG. 15 is a flowchart showing an example of the image display process (S200)

FIG. 15 is a flowchart showing an example of the image display process (S200).

First, the display control unit 35 specifies a seat ID, which is associated with the reservation information indicating "unreserved", with reference to the seating information 372 in the storage unit 37 (S202). Then, the display control unit 35 determines whether or not the information of arrangement designation has been received from the input unit 31 (S204). When the display control unit 35 has not received the information of arrangement designation from the input unit 31 (S204: No), the designated direction detection unit 32 executes processing shown in step S208.

When the information of arrangement designation has been received (S204: Yes), the display control unit 35 further specifies seats satisfying the conditions specified in the arrangement designation received from the input unit 31, among the seats specified in step S202, with reference to the seating chart 371 in the storage unit 37 (S206).

Then, the designated direction detection unit 32 specifies a direction in which the terminal apparatus 30 is currently directed, as the reference direction $d_R$, on the basis of a signal from the sensor 33, such as an acceleration sensor. Then, the designated direction detection unit 32 detects the direction in which the terminal apparatus 30 is directed, as the designated direction $d_D$ with respect to the reference direction $d_R$, on the basis of a signal from the sensor 33 (S208). Then, the designated direction detection unit 32 transmits the detected designated direction $d_D$ to the display control unit 35.

Then, the display control unit 35 searches for a viewing direction that is a direction closest to the designated direction $d_D$ received from the designated direction detection unit 32, among the viewing directions corresponding to the seats specified in step S202 or S206, with reference to the seating information 372 in the storage unit 37 (S210).

Then, the display control unit 35 determines whether or not the searched viewing direction is the same as the previously searched viewing direction (S212). When the searched viewing direction is the same as the previously searched viewing direction (S212: Yes), the input unit 31 executes processing shown in step S222.

On the other hand, when the searched viewing direction is different from the previously searched viewing, direction (S212: No), the display control unit 35 extracts the viewing distance and the price information, which are associated with the searched viewing direction, from the seating information 372 (S214).

Then, the display control unit 35 extracts a viewpoint ID, which is associated with the reservation information indicating "reserved", for each seat ID with reference to the seating information 372. Then, the display control unit 35 extracts a three-dimensional model of the reservation person, which is associated with the extracted viewpoint ID, from the reservation person model 373 in the storage unit 37.

Then, the display control unit 35 disposes the three-dimensional model of the reservation person on the seat, which is associated with the reservation information indicating "reserved", using the information of the three-dimensional shape of the inside of the concert hall stored in the three-dimensional model 370 (S216). Then, the display control unit 35 renders a two-dimensional image when the stage located at the viewing distance extracted in step S214 is viewed from the viewing direction searched in step S210 (S218). Then, the display control unit 35 displays the created two-dimensional image on the display device 36 together with the view button 301 and the seat button 302 (S220).

Then, the input unit 31 determines whether or not the user continuously touches the view button 301 displayed on the display device 36 (S222). When the user continuously touches the view button 301 (S222: Yes), the designated direction detection unit 32 executes the processing shown in step S208 again. On the other hand, when the user's finger moves away from the view button 301 (S222: No), the input unit 31 notifies the designated direction detection unit 32 that the user's finger has moved away from the view button 301, and the terminal apparatus 30 ends the process shown in this flowchart.

Up to now, the first embodiment has been described. As is apparent from the above explanation, according to the display system 10 of the present embodiment, it is possible to provide a highly convenient user interface.

Second Embodiment

Next, a second embodiment will be described with respect to the drawings.

Outline of a Process in the Second Embodiment

Figure 16:
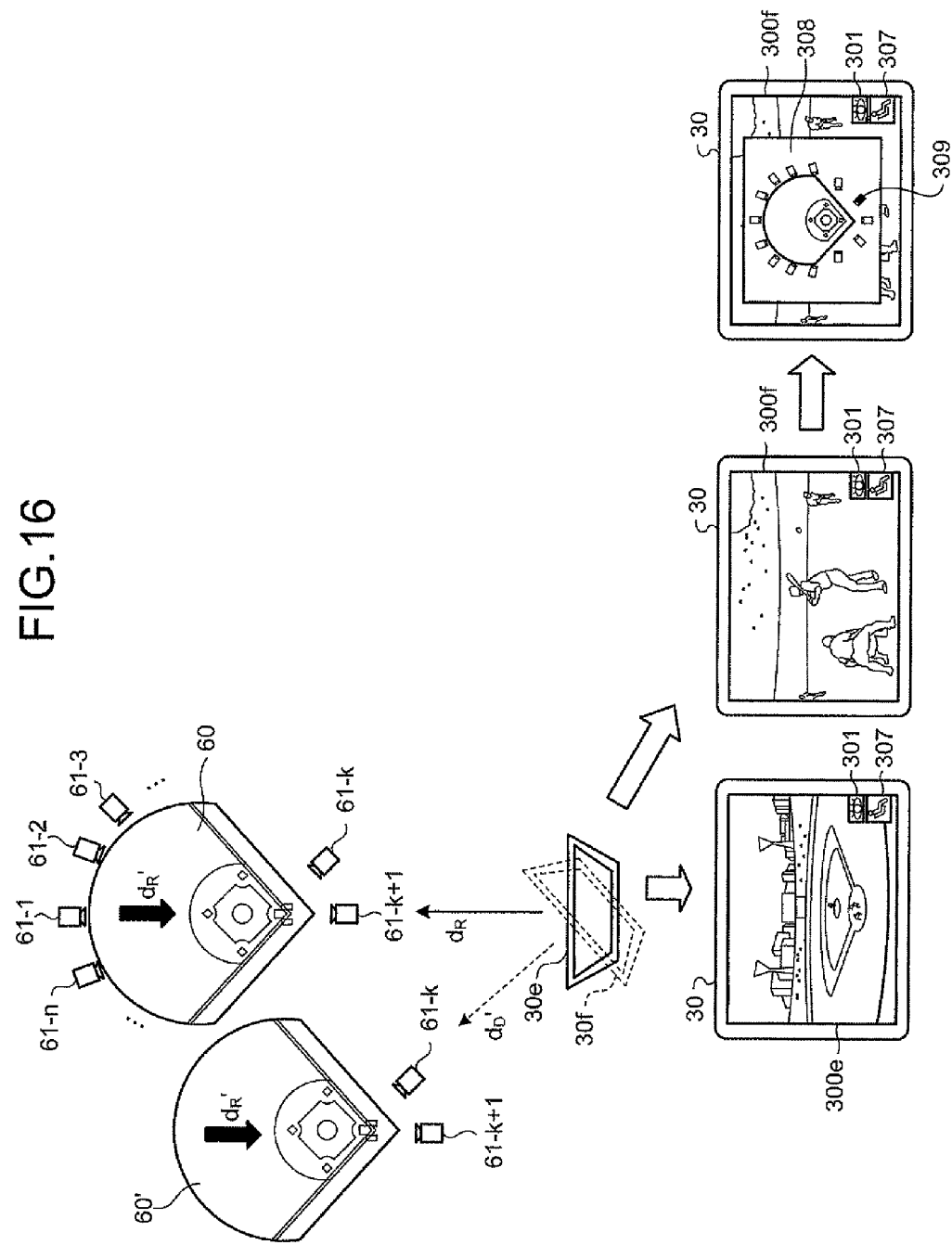
FIG. 16 is a conceptual diagram for explaining an example of the outline of a process in a second embodiment.

FIG. 16 is a conceptual diagram for explaining an example of the outline of a process in the second embodiment. In the present embodiment, around a predetermined object 60 such as a stadium, a plurality of cameras 61 to photographing the object 60 from different directions are disposed in advance (cameras 61-1 to 61-n).

First, for the object 60, the terminal apparatus 30 in the present embodiment displays an image 300e of the object 60 when viewed from a reference direction $d_R$ (for example, a direction when a stadium is viewed from a specific seat), which is set in advance, on the screen of the terminal apparatus 30. In addition, the object 60 faces a predetermined direction with respect to the reference direction $d_R$. In the example shown in FIG. 16, it is assumed that the object 60 faces a direction $d_R'$ opposite the reference direction $d_R$.

On the screen of the terminal apparatus 30, for example, a view button 301 and a camera button 307 are displayed together with the image 300e. The view button 301 is a button for receiving an instruction to change the view of the object 60. The camera button 307 is a button for receiving an instruction to display the information of the camera 61 that provides an image of a view of the object 60 after the change.

When a user touches the view button 301, the terminal apparatus 30 recognizes the direction of the terminal apparatus 30 at that time as the reference direction $d_R$. In addition, while the user is touching the view button 301, a change in the attitude of the terminal apparatus 30 is measured. On the basis of the measured attitude change, a direction in which the terminal apparatus 30 is directed is detected as a designated direction $d_D$, which is a direction relative to the reference direction $d_R$, when necessary.

For example, as shown in FIG. 16, when the attitude of the terminal apparatus 30 is changed and the direction of the terminal apparatus 30 is changed from a terminal apparatus 30e to a terminal apparatus 30f, the terminal apparatus 30 detects a direction in which the terminal apparatus 30 is directed with respect to the reference direction $d_R$ as the designated direction $d_D$.

In addition, the terminal apparatus 30 displays an image 300f, in which a direction in which the object 60 is directed with respect to the reference direction $d_R$ is maintained and the object 60 is disposed at the end of a direction $d_D'$ corresponding to the designated direction $d_D$, on the screen. In the example shown in FIG. 16, an image photographed by the camera 61-k in the photographing direction $d_D'$ closest to the designated direction $d_D$ is displayed on the terminal apparatus 30 as the image 300f. The image 300f illustrated in FIG. 16 is an image viewed as if the object 60 facing the direction $d_R'$ was disposed at a position of an object 60' at the end of the direction $d_D'$.

Thus, when the terminal apparatus 30 is directed to the left, the terminal apparatus 30 displays an image from the camera 61 that photographs the object 60 from the right side. In addition, when the terminal apparatus 30 is directed to the right, the terminal apparatus 30 displays an image from the camera 61 that photographs the object 60 from the left side. In addition, when the terminal apparatus 30 is directed upward, the terminal apparatus 30 displays an image from the camera 61 (for example, a camera installed at a low position) that photographs the object 60 from the lower side. In addition, when the terminal apparatus 30 is directed downward, the terminal apparatus 30 displays an image from the camera 61

(for example, a camera installed at a high position) that photographs the object 60 from the upper side.

Thus, when the direction of the terminal apparatus 30 is changed, the terminal apparatus 30 displays an image in which the direction of the object 60 is maintained as a predetermined direction with respect to the reference direction $d_R$ and the object 60 is disposed at the end of the direction in which the terminal apparatus 30 is directed, thereby displaying an image obtained by photographing the object 60 from the position of the viewpoint according to the direction of the terminal apparatus 30.

Therefore, the user can freely change the view of the object 60, as if the angle of the camera with respect to the object 60 as a photographic subject was changed, with an intuitive operation of changing the direction of the terminal apparatus 30.

In addition, when the user touches the camera button 307 displayed on the screen together with the image 300f, the terminal apparatus 30 displays, for example, an image 308 on the screen. The image 308 is an image for indicating a position 309 of a camera that photographs the image 300f. By viewing the image 308, the user can easily recognize from which position relative to the object 60 the user views the object 60.

In addition, although the stadium has been described as an example of the object 60 in the present embodiment, the object 60 may be a building, a monument, and the like without being limited thereto.

Outline of the Display System 10 in the Second Embodiment

Figure 17:
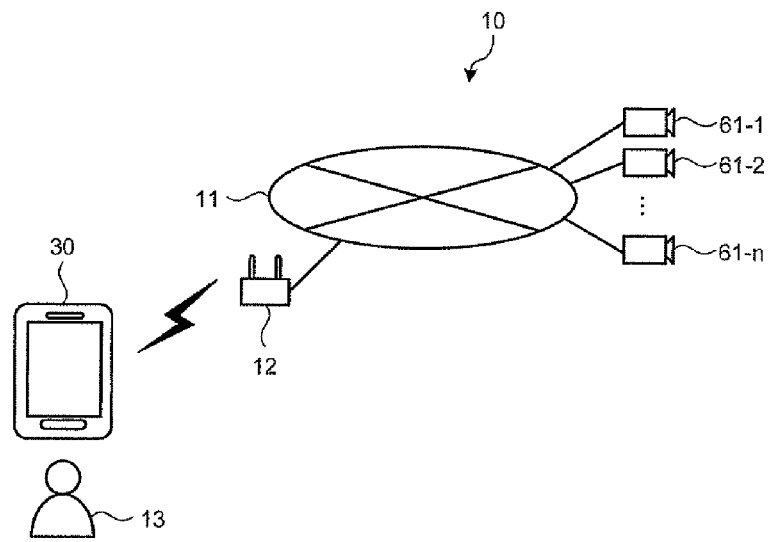
FIG. 17 is a system configuration diagram illustrating an example of a display system in the second embodiment.

FIG. 17 is a system configuration diagram illustrating an example of the display system 10 in the second embodiment. The display system 10 in the present embodiment includes the terminal apparatus 30 and the plurality of cameras 61 (cameras 61-1 to 61-n) disposed in advance around the object 60.

Each camera 61 is connected to the communication line 11. In response to the request from the terminal apparatus 30, each camera 61 transmits a photographed image to the terminal apparatus 30 through the communication line 11 together with a camera ID to identify the transmission camera 61.

The terminal apparatus 30 performs radio communication with the base station 12 connected to the communication line 11, and transmits and receives communication data to and from each camera 61 through the base station 12 and the communication line 11.

Configuration of the Terminal Apparatus 30 in the Second Embodiment

Figure 18:
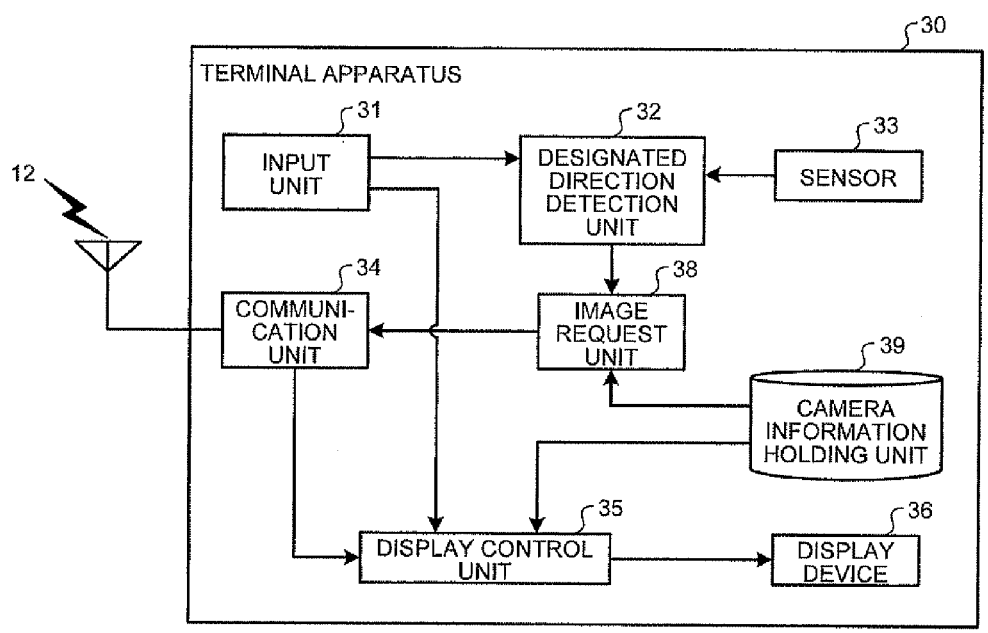
FIG. 18 is a block diagram illustrating an example of the functional configuration of a terminal apparatus in the second embodiment.

FIG. 18 is a block diagram illustrating an example of the functional configuration of the terminal apparatus 30 in the second embodiment. The terminal apparatus 30 in the present embodiment includes an input unit 31, a designated direction detection unit 32, a sensor 33, a communication unit 34, a display control unit 35, a display device 36, an image request unit 38, and a camera information holding unit 39. In addition, since the components in FIG. 18 having the same reference numerals as in FIG. 9 have the same or similar functions as the components in FIG. 9 except for those described below, explanation thereof will be omitted.

Figure 19:
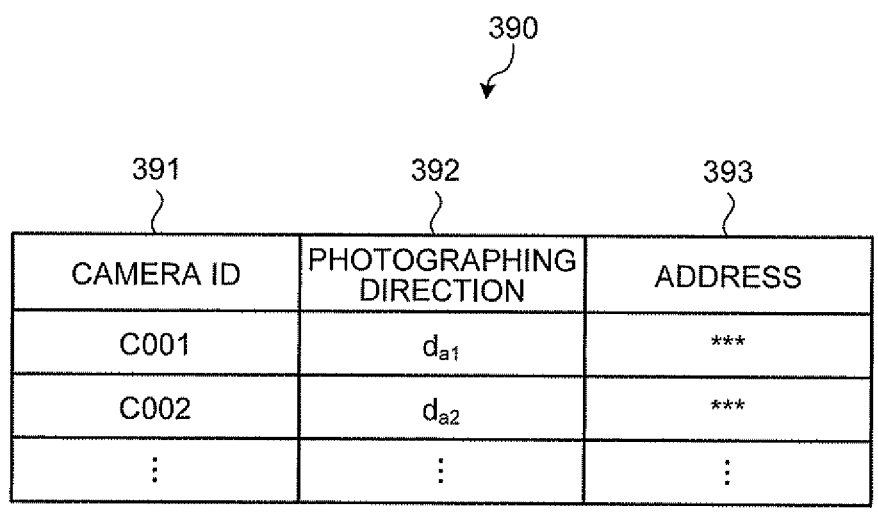
FIG. 19 is a diagram illustrating an example of the data structure of a camera table held in a camera information holding unit.

FIG. 19 shows an example of the data structure of a camera table 390 held in the camera information holding unit 39. For example, as shown in FIG. 19, a photographing direction 392 of the camera 61 and an address 393 of the camera 61 are stored in the camera table 390 so as to associate a camera ID 391 to identify each camera 61. In FIG. 19, an example is shown in which the photographing direction 392 of "$d_{a1}$," and the address 393 of "***" are stored in the camera table 390 so as to associate the camera ID 391 of "C001", for example.

Moreover, in addition to the camera table 390, the camera information holding unit 39 stores the information indicating the arrangement of the plurality of cameras 61. In addition, an image obtained by photographing the object 60 from a predetermined direction is held in the camera information holding unit 39 as a reference image.

The communication unit 34 creates an image request when an address is received from the image request unit 38. Then, the communication unit 34 transmits the created image request to the address, which has been received from the image request unit 38, through the base station 12. In addition, when a camera ID and an image are received from the camera 61 through the base station 12, the communication unit 34 transmits the received camera ID and image to the display control unit 35.

When the user touches the view button 301 displayed on the display device 36, the input unit 31 notifies the designated direction detection unit 32 that the user has touched the view button 301. When the user touches the camera button 307 displayed on the display device 36, the input unit 31 notifies the designated direction detection unit 32 that the user has touched the camera button 307.

When the notification that the user has touched the view button 301 is received from the input unit 31, the designated direction detection unit 32 specifies a direction, in which the terminal apparatus 30 is currently directed, as the reference direction $d_R$ on the basis of a signal from the sensor 33, such as an acceleration sensor.

In addition, until the notification that the user has moved the finger away from the view button 301 is received from the input unit 31, the designated direction detection unit 32 detects a direction in which the terminal apparatus 30 is directed, as the designated direction $d_D$ with respect to the reference direction $d_R$, on the basis of a signal from the sensor 33 every predetermined timing. Then, the designated direction detection unit 32 transmits the detected designated direction $d_D$ to the image request unit 38. When the notification that the user's finger has moved away from the view button 301 is received from the input unit 31, the designated direction detection unit 32 ends the detection of the designated direction $d_D$.

When the designated direction $d_D$ is received from the designated direction detection unit 32, the image request unit 38 searches for a photographing direction closest to the received designated direction $d_p$ with reference to the camera table 390 in the camera information holding unit 39. Then, the image request unit 38 extracts an address, which is associated with the searched photographing direction, from the camera table 390. Then, the image request unit 38 transmits the extracted address to the communication unit 34 when the extracted address is different from the address previously extracted.

When an application program for realizing the photographing direction change function in the present embodiment is started, the display control unit 35 acquires a reference image from the camera information holding unit 39, and displays the acquired reference image on the display device 36 together with the view button 301 and the camera button 307. In addition, when a camera ID and an image are received from the communication unit 34, the display control unit 35 displays the received image on the display device 36 together with the view button 301 and the camera button 307.

In addition, when the notification that the user has touched the camera button 307 is received from the input unit 31, the display control unit 35 acquires the information indicating the arrangement of each camera 61 from the camera information holding unit 39. Then, the display control unit 35 creates an image (image 308 in FIG. 16) indicating the position of the camera 61, which photographs the image currently displayed on the display device 36, using the camera ID received from the communication unit 34 together with the image currently displayed on the display device 36 and the information indicating the arrangement of each camera 61 acquired from the camera information holding unit 39. Then, the display control unit 35 displays the created image on the display device 36.

Processing of the Terminal Apparatus 30 in the Second Embodiment

Figure 20:
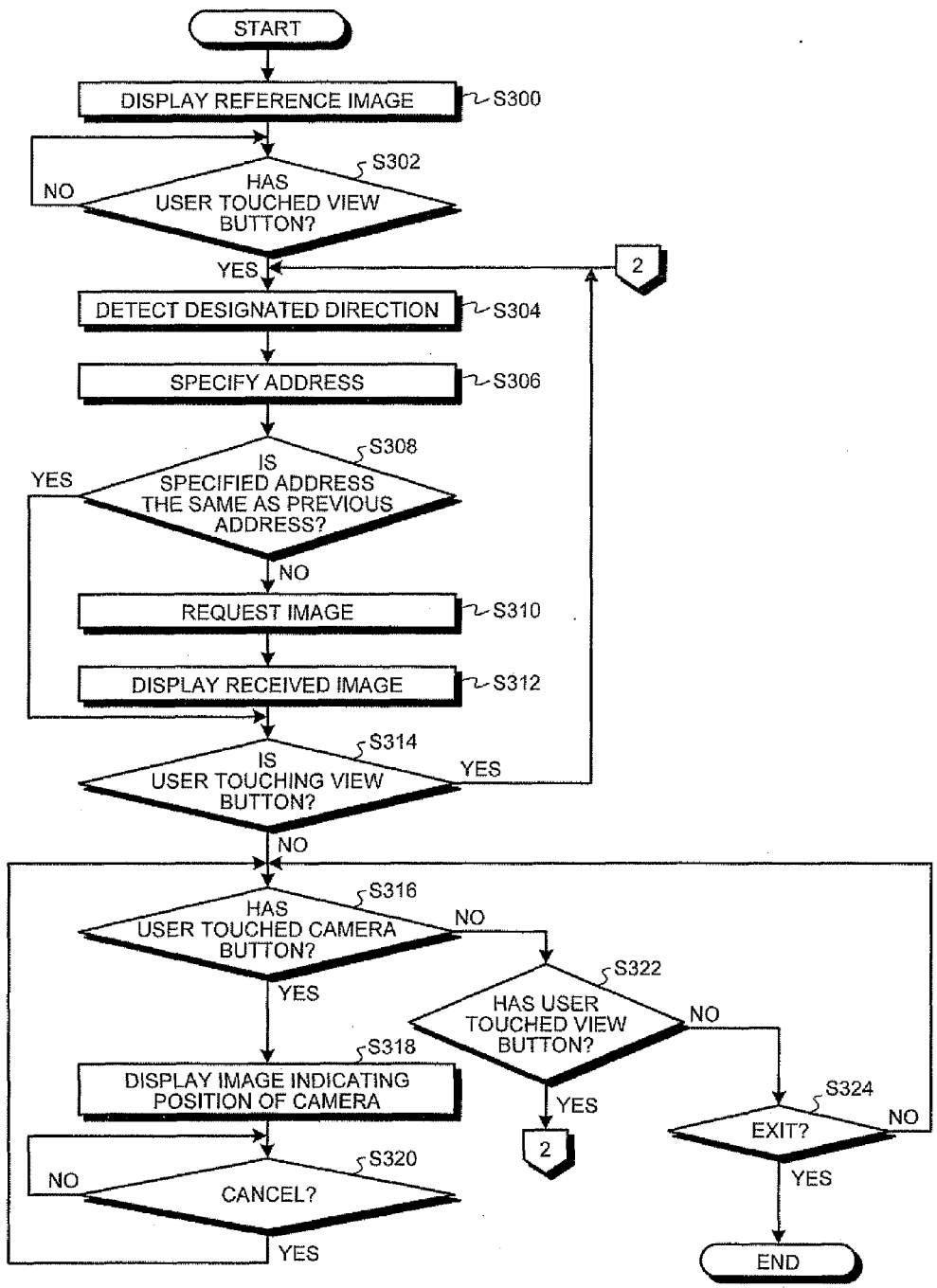
FIG. 20 is a flowchart showing an example of the operation of the terminal apparatus in the second embodiment.

FIG. 20 is a flowchart showing an example of the operation of the terminal apparatus 30 in the second embodiment. For example, when an application program for realizing the photographing direction change function in the present embodiment is started, the terminal apparatus 30 starts the operation shown in this flowchart.

First, the display control unit 35 acquires a reference image from the camera information holding unit 39, and displays the acquired reference image on the display device 36 together with the view button 301 and the camera button 307 (S300). Then, the input unit 31 determines whether or not the user has touched the view button 301 displayed on the display device 36 (S302). When the user has touched the view button 301 (S302: Yes), the input unit 31 notifies the designated direction detection unit 32 that the user has touched the view button 301.

Then, the designated direction detection unit 32 specifies a direction in which the terminal apparatus 30 is currently directed, as the reference direction $d_R$, on the basis of a signal from the sensor 33, such as an acceleration sensor. Then, the designated direction detection unit 32 detects the direction in which the terminal apparatus 30 is directed, as the designated direction $d_D$ with respect to the reference direction $d_R$, on the basis of a signal from the sensor 33 (S304). Then, the designated direction detection unit 32 transmits the detected designated direction $d_D$ to the image request unit 38.

Then, the image request unit 38 searches for a photographing direction, which is closest to the designated direction $d_D$ received from the designated direction detection unit 32, with reference to the camera table 390 in the camera information holding unit 39. Then, the image request unit 38 extracts an address, which is associated with the searched photographing direction, from the camera table 390 (S306). Then, the image request unit 38 determines whether or not the extracted address is the same as the address previously extracted (S308). When the extracted address is the same as the address previously extracted (S308: Yes), the input unit 31 executes processing shown in step S314.

When the extracted address is different from the address previously extracted (S308: No), the image request unit 38 transmits the extracted address to the communication unit 34. The communication unit 34 creates an image request and transmits the created image request to the address received from the image request unit 38 (S310).

When a camera ID and an image are received from the camera 61 in response to the transmitted image request, the communication unit 34 transmits the received camera ID and image to the display control unit 35. The display control unit 35 displays the image, which has been received from the communication unit 34, on the display device 36 together with the view button 301 and the camera button 307 (S312).

Then, the input unit 31 determines whether or not the user continuously touches the view button 301 displayed on the display device 36 (S314). When the user continuously touches the view button 301 (S314: Yes), the designated direction detection unit 32 executes the processing shown in step S304 again.

When the user's finger moves away from the view button 301 (S314: No), the input unit 31 determines whether or not the user has touched the camera button 307 displayed on the display device 36 (S316). When the user has touched the camera button 307 (S316: Yes), the input unit 31 notifies the display control unit 35 that the user has touched the camera button 307.

The display control unit 35 acquires the information indicating the arrangement of each camera 61 from the camera information holding unit 39. Then, the display control unit 35 creates an image indicating the position of the camera 61, which photographs the image currently displayed on the display device 36, using the camera ID received from the communication unit 34 together with the image currently displayed on the display device 36 and the information indicating the arrangement of each camera 61 acquired from the camera information holding unit 39. Then, the display control unit 35 displays the created image on the display device 36 (S318).

Then, the input unit 31 determines whether or not an operation to cancel the display of the image showing the position of the camera 61 has been received (S320). When the operation to cancel the display of the image showing the position of the camera 61 has been received (S320: Yes), the input unit 31 instructs the display device 36 to delete the display of the image showing the position of the camera 61 and executes the processing shown in step S316 again.

When the user has not touched the camera button 307 (S316: No), the input unit 31 determines whether or not the user has touched the view button 301 displayed on the display device 36 (S322). When the user has touched the camera button 307 (S322: Yes), the designated direction detection unit 32 executes the processing shown in step S304 again.

When the user has not touched the view button 301 (S322: No), the input unit 31 determines whether or not the exit of the application program of the photographing direction change function has been instructed by the user (S324). When the exit of the application program of the photographing direction change function has not been instructed by the user (S324: No), the input unit 31 executes the processing shown in step S316 again. On the other hand, when the exit of the application program of the photographing direction change function has been instructed by the user (S324: Yes), the terminal apparatus 30 ends the operation shown in this flowchart.

Up to now, the second embodiment has been described.

Hardware Configuration of the Terminal Apparatus 30

Figure 21:
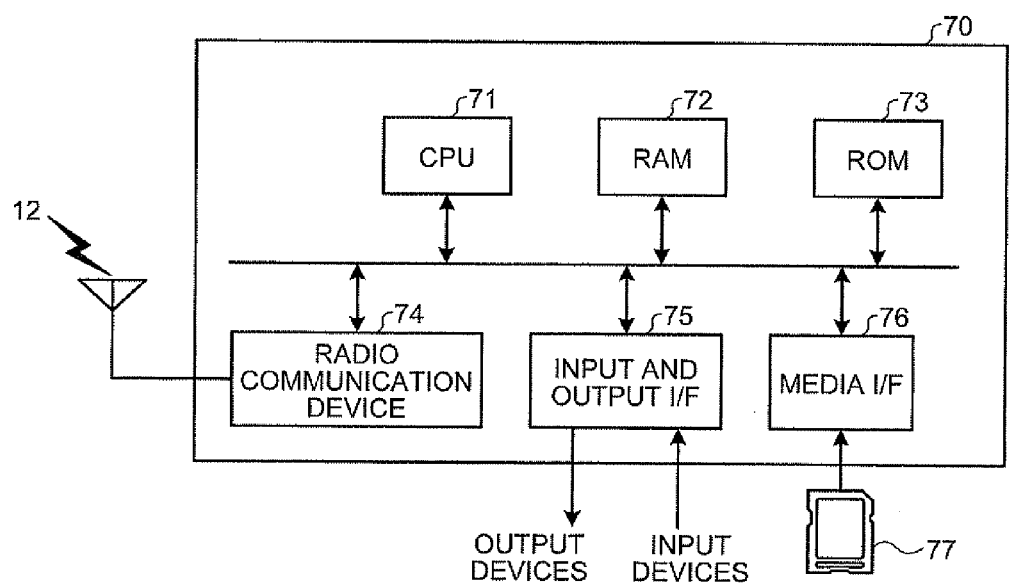
FIG. 21 is a hardware configuration diagram illustrating an example of a computer to realize the function of the terminal apparatus.

In addition, the terminal apparatus 30 in the first or second embodiment is realized by a computer 70 having a configuration shown in FIG. 21, for example. FIG. 21 is a hardware configuration diagram illustrating an example of the computer 70 to realize the function of the terminal apparatus 30. The computer 70 includes a central processing unit (CPU) 71, a random access memory (RAM) 72, a read only memory (ROM) 73, a radio communication device 74, an input and output interface (I/F) 75, and a media interface (I/F) 76.

The CPU 71 operates on the basis of a program stored in the ROM 73, and controls each unit. A boot program executed by the CPU 71 at the start of the computer 70, a program depending on the hardware of the computer 70, and the like are stored in the ROM 73. The radio communication device 74 receives data from another apparatus through the base station 12, transmits the data to the CPU 71, and transmits data generated by the CPU 71 to another apparatus through the base station 12.

The CPU 71 controls an output device, such as the display device 36, and an input device, such as a touch panel, or the sensor 33 through the input and output interface 75. The CPU 71 acquires the data from the input device or the sensor 33 through the input and output interface 75. In addition, the CPU 71 outputs the generated data to the output unit through the input and output interface 75.

The media interface 76 reads a program or data stored in a recording medium 77, and provides it to the CPU 71 through the RAM 72. The CPU 71 loads the program onto the RAM 72 from the recording medium 77 through the media interface 76, executes the loaded program. The recording medium 77 is a magnetic recording medium or a semiconductor memory, for example.

When the computer 70 functions as the terminal apparatus 30 in the first embodiment, the CPU 71 of the computer 70 realizes each function of the input unit 31, the designated direction detection unit 32, the communication unit 34, the display control unit 35, and the storage unit 37 by executing the program loaded onto the RAM 72. In addition, data in the storage unit 37 is stored in the RAM 72 or the ROM 73.

When the computer 70 functions as the terminal apparatus 30 in the second embodiment, the CPU 71 of the computer 70 realizes each function of the input unit 31, the designated direction detection unit 32, the communication unit 34, the display control unit 35, the image request unit 38, and the camera information holding unit 39 by executing the program loaded onto the RAM 72. In addition, data in the camera information holding unit 39 is stored in the RAM 72 or the ROM 73.

The CPU 71 of the computer 70 reads these programs from the recording medium 77 and executes them. However, as another example, these programs may also be acquired from other apparatuses through the communication line 11.

According to the terminal apparatus of the present embodiment, it is possible to provide a highly convenient user interface.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal apparatus that displays an image of an object, comprising a processor configured to:
   detect a designated direction, which is a direction in which the terminal apparatus is directed, with respect to a reference direction as a reference of a direction of the terminal apparatus, based on a signal from a sensor that outputs a signal indicating an attitude of the terminal apparatus;
   receive physical information indicating physical characteristics of an audience member; and
   display an image on a display device based on a position of a viewpoint of the audience member while seated in one of a plurality of seats arranged around the object, the position being derived from a height included in the physical information, in which a direction in which the object is directed with respect to the reference direction is maintained and the object is disposed at an end of a direction corresponding to the designated direction.

2. The terminal apparatus according to claim 1, further comprising:
   a memory configured to hold, for each the plurality of seats, a viewing direction that is a direction when the object is viewed from each seat,
   wherein the processor is coupled to the memory and configured to extract a viewing direction closest to the designated direction from the memory and display the image, in which the direction in which the object is directed with respect to the reference direction is maintained and the object is disposed at an end of the extracted viewing direction, on the display device.

3. The terminal apparatus according to claim 2, wherein the processor is further configured to display information of a seat, which is associated with the extracted viewing direction, on the display device.

4. The terminal apparatus according to claim 2, wherein the memory holds reservation information in association with each of the seats, which indicates whether or not each seat is reserved, and
the processor is further configured to:
   acquire reservation information of each seat from a reservation management apparatus and hold the acquired reservation information in the memory in association with each seat, and
   extract from the memory the viewing direction closest to the designated direction, among viewing directions associated with seats with which the reservation information indicating "unreserved" is associated.

5. The terminal apparatus according to claim 4, wherein the processor is further configured to display the image in which the direction in which the object is directed with respect to the reference direction is maintained and the object is disposed at the end of the extracted viewing direction, with an image of a person in a seat associated with reservation information indicating "reserved," on the display device.

6. The terminal apparatus according to claim 4, wherein:
the memory holds information indicating an arrangement of each of the seats, and
when the memory receives an arrangement designation for specifying an arrangement of two or more seats from a user, the processor is further configured to extract from the memory the viewing direction closest to the designated direction, among viewing directions associated with seats by which an arrangement of seats specified in the arrangement designation is realizable.

7. The terminal apparatus according to claim 2, wherein the processor is further configured to acquire from a reservation management server the viewing direction for each of the seats associated with the physical information and hold the acquired viewing direction for each of the seats in the memory.

8. The terminal apparatus according to claim 7, wherein the memory holds reservation information, which indicates whether or not each seat is reserved, and the physical information of a person who has reserved the seat, in association with each of the seats, and
the processor is further configured to:
   transmit a reservation request, which includes received information of a requested seat and the physical information, to a server when a reservation of the requested seat is received from a user,
   acquire the reservation information of each seat and the physical information from the server and hold the acquired reservation information and the acquired physical information in the memory in association with each seat, and
   display the image in which the direction in which the object is directed with respect to the reference direction is maintained and the object is disposed at the end of the extracted viewing direction, with an image of a person having a size corresponding to associated physical information in a seat with reservation information indicating "reserved," on the display device.

9. The terminal apparatus according to claim 2, wherein the memory holds price information in association with each seat, and
when displaying the image, in which the object is disposed at the end of the extracted viewing direction, processor is further configured to change a display method of the display device according to price information associated with a seat corresponding to the viewing direction.

10. The terminal apparatus according to claim 1, wherein:
the memory holds photographing directions of a plurality of cameras with respect to the reference direction in association with each camera that is disposed around the object and is directed to the object; and
the processor is further configured to:
specify a camera within the memory which is located in a photographing direction closest to the designated direction, and request an image of the specified camera,
display an image, which is provided in response to the request of the image of the specified camera, on the display device.

11. A display method executed by a terminal apparatus that displays an image of an object, the method comprising:
detecting a designated direction, which is a direction in which the terminal apparatus is directed, with respect to a reference direction as a reference of a direction of the terminal apparatus on based on a signal from a sensor, which outputs a signal indicating an attitude of the terminal apparatus;
receiving physical information indicating physical characteristics of an audience member; and
displaying an image based on a position of a viewpoint of the audience while seated in one of a plurality of seats arranged around the object, the position being derived from a height included in the physical information, in which the direction in which the object is directed with respect to the reference direction is maintained and the object is disposed at an end of a direction corresponding to the designated direction, on a display device by means of the terminal apparatus.

12. A non-transitory computer readable medium that records a program causing a computer to function as a terminal apparatus that displays an image of an object, the program causing the computer to perform:
detecting a designated direction, which is a direction in which the terminal apparatus is directed, with respect to a reference direction as a reference of a direction of the terminal apparatus based on a signal from a sensor that outputs a signal indicating an attitude of the terminal apparatus;
receiving physical information indicating physical characteristics of an audience member; and
displaying an image on a display device based on a position of a viewpoint of the audience member while seated in one of a plurality of seats arranged around the object, the position being derived from a height included in the physical information, in which the direction in which the object is directed with respect to the reference direction is maintained and the object is disposed at an end of a direction corresponding to the designated direction.

13. A display system, comprising:
a server; and
a terminal apparatus,
wherein the server includes:
a server memory that holds, for each of a plurality of seats arranged around an object, a viewing direction as a direction when the object is viewed from each seat in association with a range of physical information indicating physical characteristics of an audience member; and
a server processor configured to, when the physical information is received from the terminal apparatus, extract the viewing direction for each of the seats associated with the range, in which the received physical information is included, from the server memory and transmit the viewing direction to the terminal apparatus, and
the terminal apparatus includes:
a terminal memory that holds the viewing direction for each of the seats; and
a terminal processor configured to:
transmit to the server the physical information received from a user, and to receive the viewing direction for each of the seats corresponding to the physical information, which has been transmitted from the terminal, from the server and hold the received viewing direction in the terminal memory;
detect a designated direction, which is a direction in which the terminal apparatus is directed, with respect to a reference direction as a reference of a direction of the terminal apparatus based on a signal from a sensor that outputs a signal indicating an attitude of the terminal apparatus;
receive physical information indicating physical characteristics of an audience member; and
extract the viewing direction closest to the designated direction from the terminal memory and display an image on a display device based on a position of a viewpoint of the audience member while seated, the position being derived from a height included in the physical information, in which the direction in which the object is directed with respect to the reference direction is maintained and the object is disposed at an end of the extracted viewing direction.

14. The display system according to claim 13, wherein:
the server memory holds, for each of the seats, reservation information indicating whether or not the seat is reserved and the physical information of a person who has reserved each seat that is reserved,
the server processor is further configured to, when a reservation request including information of a requested seat and the physical information is received from the terminal apparatus, hold the reservation information indicating that the requested seat is reserved and the physical information, which is included in the received reservation information, in the server memory in association with the requested seat, and to transmit to the terminal apparatus a reservation notification including the requested seat, the reservation information, and the physical information held in the server memory,
the terminal processor is further configured to transmit the reservation request, which includes information of the requested seat and the physical information received from the user, to the server when a reservation of the requested seat is received from the user, and to hold the requested seat, the reservation information, and the physical information, which are included in the reservation notification, in the terminal memory in association with each other when the reservation notification is received, and the terminal processor is further configured to display the image in which the direction in which the object is directed with respect to the reference direction is maintained and the object is disposed at the end of the extracted viewing direction with an image of a person having a size corresponding to associated physical information in a seat with reservation information indicating "reserved," on the display device.

* * * * *